April 12, 1960
P. H. BRENNAN
2,932,177
AUTOMOBILE AIR CONDITIONER
Filed April 17, 1957
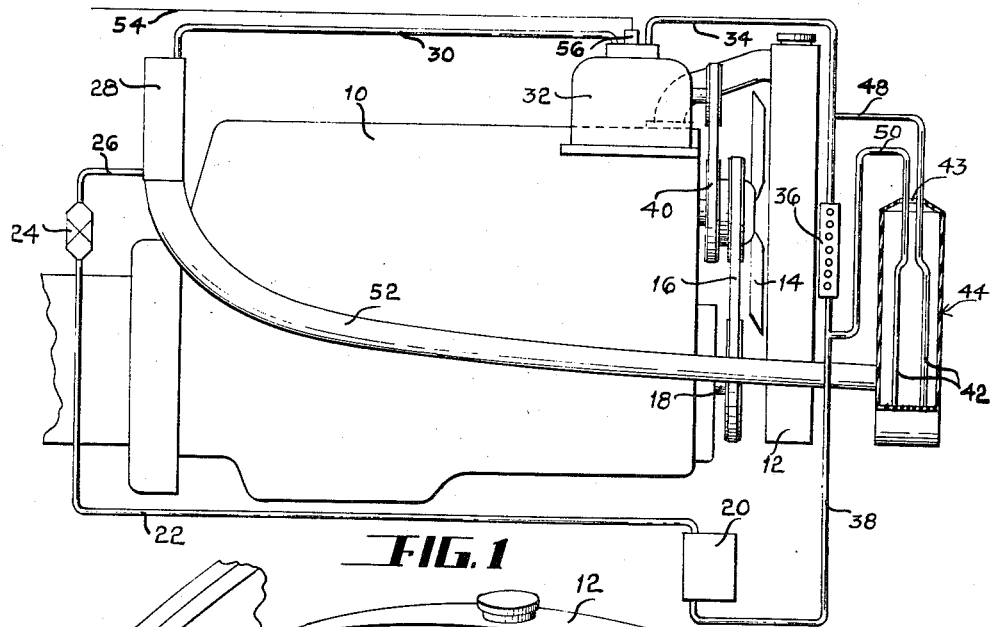
FIG. 1
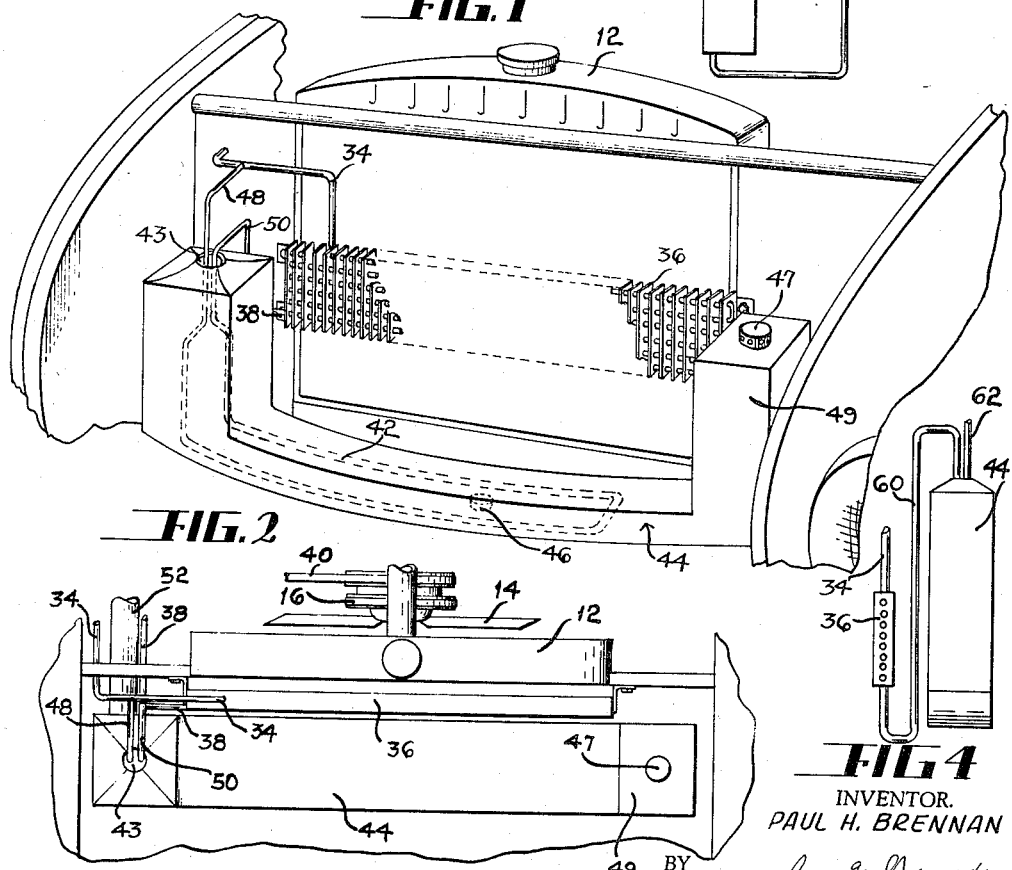
FIG. 2
FIG. 3
FIG. 4
INVENTOR.
PAUL H. BRENNAN
BY
Dybvig and Jacox
HIS ATTORNEYS

United States Patent Office 2,932,177
Patented Apr. 12, 1960

2,932,177

AUTOMOBILE AIR CONDITIONER

Paul H. Brennan, Dayton, Ohio

Application April 17, 1957, Serial No. 653,398

3 Claims. (Cl. 62—244)

This invention relates to an automobile air conditioner and more particularly to improvements relating to the rejection of heat by air conditioners to the ambient atmosphere, although not necessarily so limited.

In conventional automobile air conditioners, evaporators through which a liquid refrigerant flows are employed to extract heat from the passenger compartment of the automobile. The refrigerant, which vaporizes in accepting heat in the evaporator, is subsequently compressed by a compressor then passed through a condenser which extracts the heat from the refrigerant vapor and rejects this heat to the ambient atmosphere.

Although automobile air conditions may take various forms, the currently preferred form utilizes an air cooled condenser for rejecting heat to the ambient atmosphere. Since it is convenient to place the compressor under the hood of the automobile where it can be driven directly by the automobile engine, it is also preferred to place the air cooled condenser under the hood, forward of the automobile radiator where appreciable quantities of air are available for cooling.

This type of air conditioning apparatus has introduced numerous problems in the automobile industry. One of the problems is that the air cooled condenser introduces a considerable amount of weight in the front end of the automobile and accordingly the automobile suspension system usually must be redesigned to accommodate this weight.

A further and more significant problem is that the air cooled condenser being forward of the automobile radiator partially shields this radiator and further presents a considerable amount of heat to the air passing to the radiator, thus reducing the cooling capacity of the automobile radiator. This effect is somewhat reciprocal in that, as the efficiency of the automobile radiator decreases, its temperature rises and when the automobile is idling, the heat of the radiator adversely affects the cooling capacity of the air cooled condenser. To circumvent this problem it is necessary to materially increase the capacity of the automobile radiator. This means that either a larger radiator, or a higher pressure radiator will be required.

Due to the fact that a radiator of increased capacity is required in automobiles utilizing this type of air conditioner, the cost of the air conditioning system and its installation is inflated. The present invention offers a novel solution to the problems discussed, with the consequent advantages that the air conditioning apparatus is initially less expensive and has increased cooling capacity and that the cost of maintenance and operation is reduced.

An object of the present invention is to improve automobile air conditioning systems utilizing an air cooled condenser by providing a second water cooled condenser operating in combination with the air cooled condenser so as to increase the condenser capacity of the air conditioning system, while at the same time permitting a substantial reduction in the size and capacity of the air cooled component of the condenser assembly.

Another object of this invention is to provide a water cooled condenser for use in combination with the air cooled condenser of an automobile air conditioning assembly wherein the water cooled condenser is enveloped by a preferably pliable water tank which may be adapted to conform to the shape of the front end of the automobile so as to be nestled in the front end of the automobile without obstructing the path of air to the automobile radiator.

Still another object of the present invention is to provide a water cooled condenser for use in combination with the air cooled condenser of an automobile air conditioning system, the water cooled condenser residing in a water tank which derives its water, in part, from the water condensate accumulating on the evaporator unit employed to extract heat from the passenger compartment of the automobile.

Other objects and advantages reside in the construction of parts, the combination thereof, the method of manufacture and the mode of operation, as will become more apparent from the following description.

In the drawing,

Figure 1 is a schematic view of an automobile air conditioning apparatus of the type which is carried under the hood of the automobile in close proximity to the automobile power plant.

Figure 2 is a fragmentary perspective view of air cooled and water cooled condenser elements for the air conditioning apparatus of Figure 1 installed in the forward end of an automobile.

Figure 3 is a fragmentary top plan view of the air cooled and water cooled condenser elements of Figure 2.

Figure 4 is a fragmentary elevational view of a modification.

Referring to the drawing in detail, Figure 1 shows schematically the power plant of an automobile including an internal combustion engine 10, an automobile radiator 12, and a radiator fan 14 driven through a belt 16 from the crankshaft 18 of the engine 10. Illustrated in association with this power plant is the air conditioning apparatus of this invention.

This apparatus comprises a receiver 20 containing a quantity of liquid refrigerant, a conduit 22 communicating from the receiver 20 to an expansion valve 24, a conduit 26 leading from the expansion valve 24 to an evaporator 28, a conduit 30 leading from the evaporator 28 to a compressor 32, a conduit 34 leading from the compressor 32 to an air cooled condenser 36, and a conduit 38 leading from the air cooled condenser 36 to the receiver 20. The compressor 32 is driven by the crankshaft 18 through a belt 40 connecting the compressor to the radiator fan 14. Thus, the compressor 32 operates in unison with the radiator fan 14. It is to be understood, however, that other means and belting arrangements may be employed to drive the compressor from the automobile engine.

The air conditioning apparatus, as described thus far, constitutes one type of air conditioner currently employed in air conditioning automobiles. This air conditioning apparatus operates as follows. Liquid refrigerant circulating through the receiver 20 under high pressure passes through the expansion valve 24 emerging at low pressure, then passes through the evaporator 28 where it becomes vaporized in extracting heat from the evaporator, thus heat is indirectly extracted from the air surrounding the evaporator.

The evaporator 28 may be placed directly in the passenger compartment of the automobile, or may be placed in communication with the passenger compartment of the automobile through suitable air ducts.

The vaporized refrigerant is drawn from the evaporator 28 by the compressor 32 which compresses the vaporized refrigerant. The vaporized refrigerant, now under pressure, flows to the air cooled condenser 36 which functions to extract heat from the refrigerant, transferring this heat to the ambient atmosphere, liquifying the refrigerant. The refrigerant liquid next passes through the conduit 38 to the receiver 20, completing its refrigerating cycle.

As illustrated in the drawing, the air cooled condenser 36 is positioned in front of the automobile radiator 12. The reason for locating the air cooled condenser at this location is threefold. First, the air cooled condenser will be exposed to the cooling air stream when the automobile is in motion, thus making for high efficiency of operation. Second, the air cooled condenser will be in the path of air moved by the radiator fan and hence will have some cooling capacity even when the automobile is idling and not in motion. Third, the air cooled condenser is in close proximity to the compressor 32, thus providing for a compact refrigeration cycle.

As emphasized hereinbefore, the chief objection to locating the air cooled condenser in front of the automobile radiator is that the heat extracted from the refrigerant by the air cooled condenser is presented directly to the automobile radiator, which, as a consequence, operates with a reduced efficiency. This objection is substantially overcome in the present invention by employing an air cooled condenser of reduced size and reduced cooling capacity, such that the amount of heat presented to the automobile radiator is materially reduced. The loss in cooling capacity in the air cooled condenser 36 is compensated by the provision of a water cooled condenser 42 which operates in combination with the air cooled condenser 36.

The water cooled condenser 42, as illustrated in the drawing, is situated within a U-shaped water tank 44 nestled in the front end of the automobile in the open compartment between the automobile radiator and the automobile grill. The water tank 44 has been formed into a U-shape so as not to obstruct the passage of air through the grill to the air cooled condenser 36 and the automobile radiator 12. The water tank may of course be installed in other compartments of the automobile.

Due to the fact that there are many variations in automobile designs and wide tolerances in the construction of the grill area of automobiles, it is desirable, but not essential, to construct the water tank 44 of a pliable material, such as a plastic, or a synthetic rubber, so that the water tank may be loosely secured in position and permitted to conform itself to the contour of the forward part of the automobile. By employing resilient materials in the fabrication of the water tank 44, the danger of damage to the tank 44 in subfreezing temperatures caused by the formation of ice in the tank is precluded. Even so, the preferred practice is to drain the tank 44 by means of a plug, such as that illustrated at 46, in those seasons of the year in which the air conditioning apparatus would be idle.

As illustrated in Figures 2 and 3, the water tank 44 is provided at one end with an opening 43 receiving conduits associated with the condenser 42 and functioning as an inlet for filling the tank with water. At the other end the tank 44 is provided with a vent 47 for releasing water vapor to the atmosphere. The vent 47 is essential to prevent a build-up of vapor pressure in the upright portion 49 of the water tank which would force water out the opening 43.

In the preferred embodiment illustrated, the water cooled condenser 42 is connected in parallel relation to the air cooled condenser 36. Thus, the refrigerant under pressure in the conduit 34 can flow directly to the air cooled condenser 36 and can also flow through a conduit 48 to the water cooled condenser 42, then through a conduit 50 merging with the conduit 38 connecting to the receiver 20. When the air cooled and water cooled condensers are connected in parallel in this manner, the air conditioning apparatus operates at maximum efficiency in view of the cooling capacity of the condensers 36 and 42. Each of the condensers 36 and 42 will extract as much heat from the refrigerant as their capacity permits, taking into consideration the operating speed of the automobile and the ambient temperature of the atmosphere. When the automobile is idling, the capacity of the air cooled condenser 36 will be at its minimum level and the burden of heat extraction will fall upon the water cooled condenser 42. On the other hand, when the automobile is in motion, such that the air cooled condenser 36 is operating at high efficiency, this condenser will assume the burden of heat extraction reducing the work load carried by the water cooled condenser. Obviously, each condenser will assume a work load in proportion to its cooling efficiency as determined by the speed of the automobile and the ambient temperature of the atmosphere.

The water cooled condenser 42 operates to reduce the amount of heat presented by the air conditioning apparatus to the automobile radiator by virtue of the mechanism by which heat is extracted from the refrigerant. In the water cooled condenser the heat extracted is consumed in heating and vaporizing the water in the tank 44. Since this heat produces a change of state in the water, it is unavailable to the automobile radiator 12 and does not interfere with the cooling capacity of the automobile radiator. As a result of this mechanism, however, the tank 44 is continually losing water which must be replenished.

As a means of replenishing water in the tank 44, water condensate accumulating on the evaporator 28 is collected and conveyed through a conduit 52 to the water tank 44. This conduit 52 forms a closed connection between the evaporator and the water tank 44 and thus provides for free withdrawal of water from the evaporator unit without a consequent danger of leakage of carbon monoxide into the passenger compartment. In this respect, it is desirable that the conduit 52 connect to the water tank 44 below the established water level in this tank such that water will back up into the conduit forming an air seal therein. This condensate forms on the evaporator 28 due to the fact that the temperature of the surface of the evaporator is below the dew point of the surrounding atmosphere. The condensate is collected in the conventional manner by means of a tray (not shown) placed under the evaporator and is conveyed by gravity to the water tank 44. In some installations a gravity feed may be impractical and a simple pump would then be employed for moving the condensate to the water tank 44.

It is found preferable in designing the present air conditioner to balance the capacity of the air cooled condenser with respect to the capacity of the water cooled condenser, such that under average operating conditions, the amount of water vaporized by the water cooled condenser will be fully replenished by the amount of water condensate obtained from the evaporator. Naturally, average conditions are seldom met. However, by balancing the operation of the air conditioner for average conditions, the need for adding water to the water tank 44 during non-average operating conditions will be at a minimum. Usual stops for gas and oil for the automobile engine will ordinarily be sufficient.

The use of a water cooled condenser, as outlined herein, has numerous advantages. Chief among these is the increased operating efficiency of the air conditioner resulting from the fact that two condensers are used, one which operates at peak efficiency only when the automobile is moving, and the other operating with good efficiency even when the automobile is not moving.

This increased efficiency results in reduced head pressure in the conduit 34 and therefore higher cooling capacity for the air conditioner. The reduced head pressure lessens the danger of explosion or other damage to the compressor. Also the reduced head pressure means that less work is required in starting the automobile after it has stalled with the air conditioner in operation. This factor is particularly important in situations where an automobile has stalled in a hazardous place and the driver attempts to make a "panic start." With the present invention, due to the fact that the head pressure on the compressor is reduced, the danger of starter failure in making panic starts is reduced.

As a means for giving the automobile driver information regarding the head pressure on the compressor, a pressure sensing line 54 connecting to the automobile dash panel has been illustrated in Figure 1. This line is connected with a pressure sensing element 56 associated with the compressor. The dash panel meter may be appropriately marked to indicate a danger zone, giving warning to the driver that the head pressure on the compressor is excessive and that the compressor should be stopped to enable the head pressure to drop to a safe level. Similarly, a temperature sensing element indicating the temperature in the compressor 32 may be employed.

The preferred embodiment, as described herein, utilizes air cooled and water cooled condensers in parallel relation. As a modification of the present device it may be desirable, under certain circumstances, to connect the air cooled and water cooled condensers in series relation. As illustrated in Figure 4, the arrangement may be such that the air cooled condenser 36 receives refrigerant directly from the compressor through the conduit 34, and the water cooled condenser housed in the water tank 44 receives refrigerant from the air cooled condenser through a conduit 60. The liquified refrigerant then passes to the receiver through a conduit 62.

With this arrangement, the available capacity of the air cooled condenser is fully utilized at all times and the water cooled condenser is utilized only when the capacity of the air cooled condenser is insufficient to satisfy the needs of the air conditioning apparatus. As a result, the consumption of water from the water tank 44 is kept to a minimum, however, the efficiency of operation of the air conditioner will not always be at a maximum. This is particularly so when the automobile is stationary and the engine is idling, such that the air cooled condenser is operating at its lowest efficiency, such that a high head pressure develops in the conduit 34.

As another alternative, the series connection between the air cooled condenser and the water cooled condenser may be reversed such that the water cooled condenser receives refrigerant directly from the compressor and the air cooled condenser receives refrigerant from the water cooled condenser. With this arrangement, the air conditioner will operate at relatively high efficiency when the automobile is stationary and the engine is idling, and will operate at a maximum efficiency when the automobile is in motion. However, large quantities of water will be consumed by the water condenser since the available capacity of this condenser will be fully utilized at all times. Accordingly, this latter type of series connection between the condensers appears to be less desirable than the former type for automobile air conditioner applications.

Although the preferred embodiments of the device have been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention I claim:

1. In an apparatus for conditioning the passenger compartment of automobiles and the like having an air cooled heat radiator and a fan for moving air over the radiator, said apparatus including a liquid refrigerant, an evaporator communicating with said passenger compartment for receiving said refrigerant to extract heat from the passenger compartment, means receiving vaporized refrigerant from the evaporator for compressing the refrigerant vapor, said means including a compressor receiving power from the automobile engine, and an air cooled condenser receiving the compressed refrigerant vapor for extracting heat from the refrigerant vapor and rejecting the heat to the ambient atmosphere, said air cooled condenser being positioned forward of said fan and said heat radiator, the improvement including a second condenser coupled in parallel relation with the air cooled condenser, means providing a water bath for said second condenser, and means for collecting water condensate from said evaporator and conveying the condensate to said water bath.

2. The improvement according to claim 1 wherein said evaporator is disposed at a higher elevation than said water tank and the means for collecting water condensate from said evaporator and conveying the condensate to said water bath includes a downwardly extending closed conduit communicating at one end with the evaporator and connecting at the other end to the water tank below the established water level therein.

3. In an apparatus for conditioning the passenger compartment of automobiles and the like, said apparatus including a liquid refrigerant, an evaporator communicating with said passenger compartment for receiving said refrigerant to extract heat from the passenger compartment, means receiving vaporized refrigerant from the evaporator for compressing the refrigerant vapor, said means including a compressor receiving power from the outomobile engine, and an air cooled condenser receiving the compressed refrigerant vapor for extracting heat from the refrigerant vapor and rejecting the heat to the ambient atmosphere, the improvement including a second condenser coupled in parallel relation with the air cooled condenser, means providing a water bath for said second condenser, said water bath including a water tank of pliable resilient material nestled in the forward end of the automobile and enveloping the second condenser, said water tank assuming a contour matching that of the forward end of the automobile in which it is nestled, and means for collecting water condensate from said evaporator and conveying the condensate to said water bath.

References Cited in the file of this patent

UNITED STATES PATENTS

| | | |
|---|---|---|
| 1,064,272 | Wolf | June 10, 1913 |
| 1,874,803 | Reed | Aug. 20, 1932 |
| 1,935,281 | Reed | Nov. 14, 1933 |
| 1,969,863 | Strang et al. | Aug. 14, 1934 |
| 2,009,882 | Fourness | July 30, 1935 |
| 2,181,354 | Winters | Nov. 28, 1939 |
| 2,296,997 | Knoy | Sept. 29, 1942 |
| 2,323,511 | Baker | July 6, 1943 |
| 2,355,289 | Gibson | Aug. 8, 1944 |
| 2,771,750 | Oldberg | Nov. 27, 1956 |
| 2,820,351 | Dolza et al. | Jan. 21, 1958 |